United States Patent [19]

Maxwell et al.

[11] 3,998,495
[45] Dec. 21, 1976

[54] LOCKING DASHBOARD CONTROL VALVE

[75] Inventors: John P. Maxwell, Chatham, N.J.; John M. Ury, Hazelwood, Mo.

[73] Assignee: Wagner Electric Corporation, Parsippany, N.J.

[22] Filed: Sept. 29, 1975

[21] Appl. No.: 617,426

Related U.S. Application Data

[63] Continuation of Ser. No. 520,559, Nov. 4, 1974.

[52] U.S. Cl. .................. 303/89; 180/114
[51] Int. Cl.[2] ..................... B60T 17/16
[58] Field of Search .............. 180/114; 188/265; 303/9, 71, 89; 70/179

[56] References Cited

UNITED STATES PATENTS

| | | | |
|---|---|---|---|
| 3,095,244 | 6/1963 | Valentine et al. | 303/9 |
| 3,557,584 | 1/1971 | Triglia | 180/114 X |
| 3,625,573 | 12/1971 | Conn | 303/89 |
| 3,770,324 | 11/1973 | Stevenson et al. | 303/89 X |

*Primary Examiner*—Duane A. Reger
*Attorney, Agent, or Firm*—Eyre, Mann, Lucas & Just

[57] ABSTRACT

A control valve for selectively establishing connections between the spring applied parking brake in an air braked vehicle and either the parking brake air reservoir or the exhaust port of the control valve, and incorporating a lock which enables the operator to secure the control valve in the position in which the parking brakes are applied.

4 Claims, 1 Drawing Figure

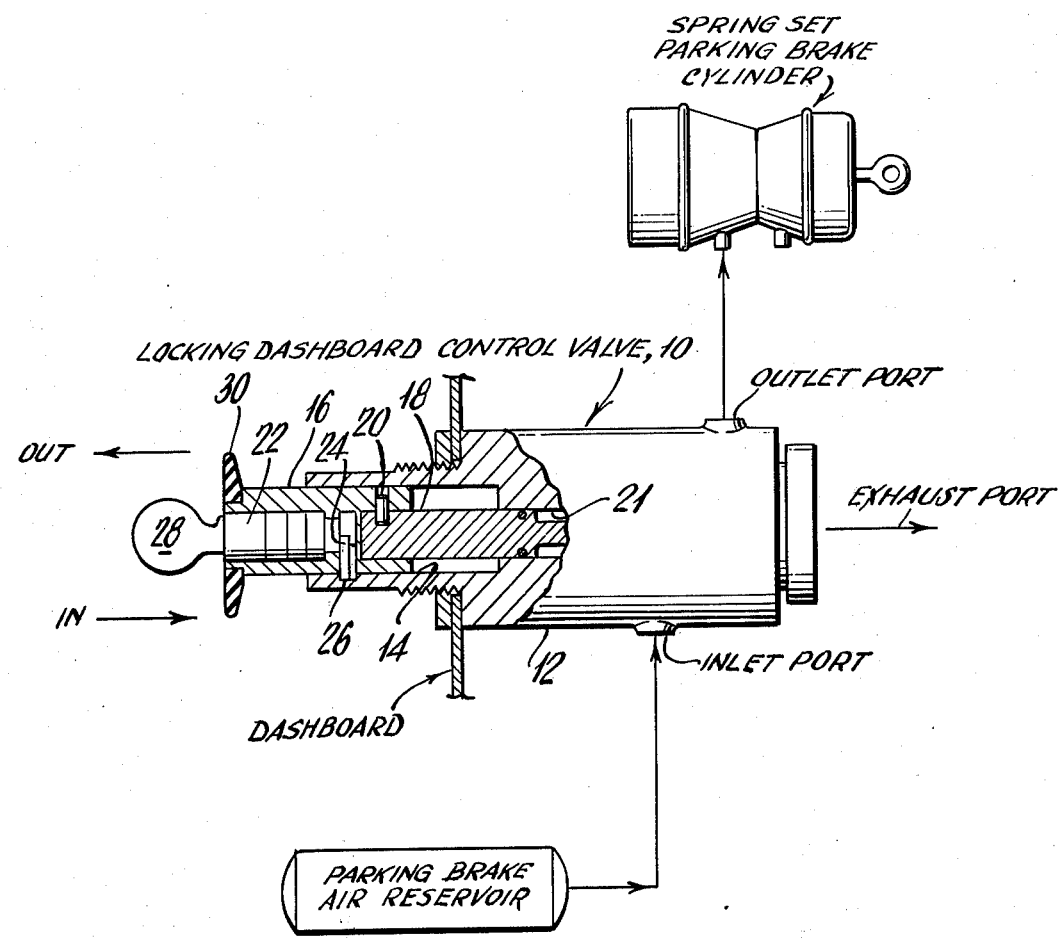

LOCKING DASHBOARD CONTROL VALVE

This is a continuation, of application Ser. No. 520,559, filed 11/4/74.

BACKGROUND OF THE INVENTION

Various forms of control valves by which the operator of an air braked vehicle can control the interconnection between an air reservoir and a spring applied parking brake are known in the art. For example, see U.S. Pat. No. 3,519,312 (O. B. Cruse) entitled CONTROL VALVE and issued on July 7, 1972 to the assignee of the present invention, the disclosure of which is incorporated herein by reference. Another example of such a control valve is described in U.S. Pat. No. 3,746,401 (G. W. Stearns) entitled CONTROL VALVE AND SYSTEM and issued on July 17, 1973 to the assignee of the present invention, the disclosure of which is also incorporated herein by reference.

None of the known control valves of this type have any kind of antitheft feature, i.e., means by which a would-be thief is prevented from operating the control valve so as to release the brakes and thereafter drive off with the vehicle.

SUMMARY OF THE INVENTION

The present invention is embodied in and carried out by a control valve incorporating a lock which enables an authorized operator in possession of the associated key to lock the control valve in a position in which the controlled brakes are actuated.

BRIEF DESCRIPTION OF THE DRAWING

The present invention may be better understood by reading the written description thereof in relation to the accompanying drawing, which is a side view, partly broken away, of the locking dashboard control valve embodying the present invention, showing the connections thereof to related components in a spring applied, air released, parking brake system.

DETAILED DESCRIPTION OF THE PREFERRED EMBODIMENT

Referring now to the drawing, locking dashboard control valve 10 comprises a housing 12 having a large bore 14 therein. Sliding closure member 16 is positioned in bore 14, and is eccentrically connected to the valving rod 18 by means of a roll pin 20 extending through aligned radial bores in the closure member 16 and rod 18. With the valving rod 18 slidably engaged with a reduced bore 21 which extends eccentrically from the large bore 14, rotation of closure, member 16 within bore 14 is prevented, thus ensuring constant alignment of the lock 22. The valving members carried on rod 18 and the remaining cooperative elements of the control valve 10 which establish interconnections between the inlet, outlet and exhaust ports thereof may be of any design presently known or which may become known, and since they form no part of the inventive concept, these parts are not shown.

The lock 22 is secured in known manner in the hollowed sliding closure member 16, which has a transverse cut for receiving the radially extendable and retractable locking cam 24 of lock 22 and for allowing the movement of the locking cam 24 so as to have its free end extend beyond the periphery of closure member 16 and into the associated locking recess 26 in housing 12, as shown. The lock 22 is actuatable by a key 28. The lock-key combination may be any one of a number of such combinations which are presently known or which may become known. Applicants have found a standard single-bitted plug lock No. 75-3 of Chicago Lock Company to be suitable for this application. The key slot in lock 22 is positioned in the aperture defined by the hollowed closure member 16, about which aperture a knob 30 is secured in known manner for facilitating push-pull (IN-OUT) operation of the control valve 10 by the operator. In the drawing, the control valve 10 is shown locked in the OUT position, in which the outlet port is isolated from the inlet port and is connected to the exhaust port, thereby applying the associated parking brake.

The advantages of the present invention, as well as certain changes and modifications of the disclosed embodiment thereof, will be readily apparent to those skilled in the art. For example, the lock 22 could be mounted in a suitably modified valve housing 12, with the locking cam 24 disposed for engagement with a locking recess in the slidable closure member 16. The control valve could be mounted in such a way that, when locked, the locking cam and recess are behind the dashboard, rather than in front of it as shown, thereby making it more difficult to tamper with the lock. The lock could be made removeable from the control valve, e.g., by having diametrical aligned bores through the valve housing 12 and slidable closure member 16 for insertion of a padlock. It is the applicants intention to cover all those changes and modifications which could be made to the embodiment of the invention herein chosen for the purposes of the disclosure without departing from the spirit and scope of the invention.

What is claimed is:

1. In a vehicle air brake system, the combination comprising a parking brake cylinder having a spring applied parking brake which is released by the introduction of air into the cylinder at a pressure greater than atmospheric pressure, a parking brake air reservoir, a push-pull control valve and locking means operative when actuated to secure said control valve in a predetermined position, said valve comprising: (a) a housing having a large bore therein; (b) a slidable closure member in said large bore, said locking means being disposed in said slidable closure member; (c) a valving rod eccentrically connected to said slidable closure member; and (d) a reduced bore extending eccentrically from said large bore, said valving rod being slidably engaged with said reduced bore.

2. The combination according to claim 1, wherein said housing has a locking recess, and said locking means includes a radially extendable and retractable locking cam which, when extended to be in engagement with said locking recess, retains said push-pull control valve in said predetermined setting.

3. The combination according to claim 2, wherein said slidable closure member includes a transverse channel in which said radially extendable and retractable locking cam of said locking means is moveable.

4. The combination according to claim 2, wherein said locking recess extends radially outwardly from said large bore.

* * * * *